United States Patent [19]

Nagano

[11] Patent Number: 4,854,191
[45] Date of Patent: Aug. 8, 1989

[54] SPEED CHANGE DEVICE FOR A BICYCLE
[75] Inventor: Masashi Nagano, Izumi, Japan
[73] Assignee: Shimano Industrial Company Limited, Osaka, Japan
[21] Appl. No.: 217,335
[22] Filed: Jul. 11, 1988
[30] Foreign Application Priority Data Jul. 13, 1987 [JP] Japan .................. 62-174246

[51] Int. Cl.[4] .............. F16H 5/04; F16H 57/10
[52] U.S. Cl. ...................... 74/750 B; 74/766
[58] Field of Search ............. 74/750 B, 781 B, 766, 74/767; 192/48.92, 46, 6 A

[56] References Cited

U.S. PATENT DOCUMENTS

| | | | |
|---|---|---|---|
| 2,301,852 | 11/1942 | Brown | 74/766 |
| 3,973,451 | 8/1976 | Kine | 74/750 B |
| 4,262,786 | 4/1981 | Taylor | 192/48.92 X |
| 4,574,928 | 3/1986 | Norton | 192/48.92 |
| 4,628,769 | 12/1986 | Nagano | 74/750 B |
| 4,651,853 | 3/1987 | Bergles | 74/750 B |
| 4,721,015 | 1/1988 | Hartman | 74/781 B |

FOREIGN PATENT DOCUMENTS 099293  5/1987  Japan .

Primary Examiner—Leslie A. Braun
Assistant Examiner—William Gehris
Attorney, Agent, or Firm—Stevens, Davis, Miller & Mosher

[57] ABSTRACT

A speed change device for a bicycle is provided which includes a planetary gear mechanism in which a plurality of lock pawls are provided at a fixed shaft to control locking and unlocking of a plurality of sun gears. The sun gears are independently rotatably supported relative to a crank shaft. A plurality of clutch pawls corresponding to the lock pawls are provided at a control member, with the clutch pawls being actuated by driving rotation of the crank shaft. This enables the lock pawls to be controlled to move from a locking position to an unlocking position.

6 Claims, 3 Drawing Sheets

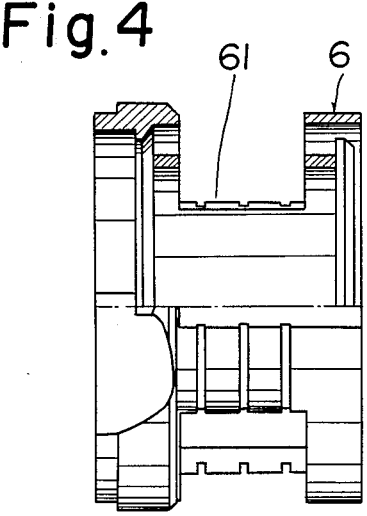
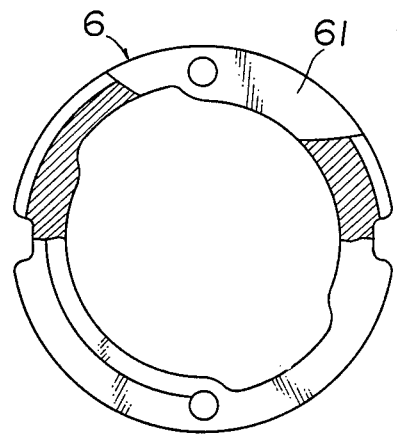
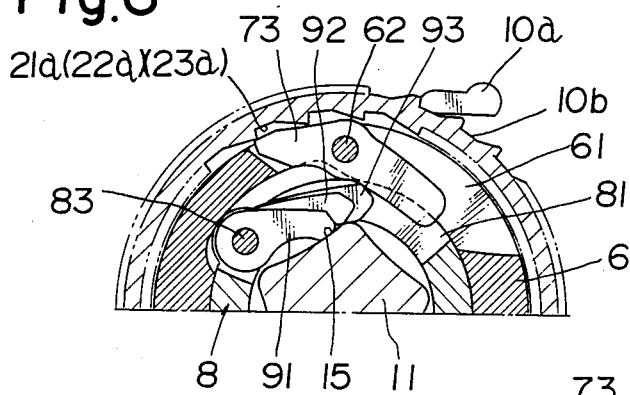
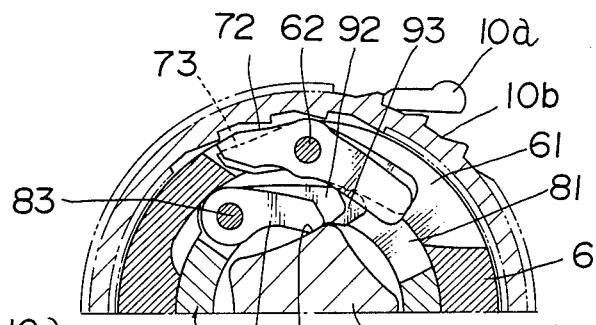
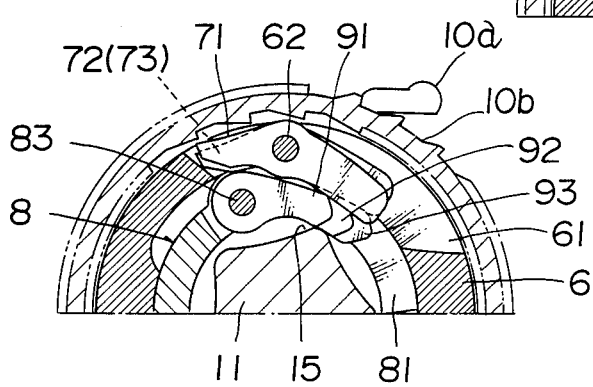

SPEED CHANGE DEVICE FOR A BICYCLE

FIELD OF THE INVENTION

The present invention relates to a speed change device for a bicycle, and more particularly, to a speed change device for a bicycle which is provided around a crank shaft rotatably supported to the bicycle frame and which has a planetary gear mechanism.

BACKGROUND OF THE INVENTION

Generally, a bicycle speed change device includes a front speed change device mounted to the front side of the bicycle and a rear speed change device mounted at the rear side of the same.

The conventional front side speed change device, as disclosed in Japanese Patent Laid Open-Gazette No. Sho 62-99,293, is constructed such that (1) a cylindrical fixing member is provided around the crank shaft, (2) a plurality of sun gears are independently rotatably supported around the fixing member, (3) planetary gears engageable with the sun gears are supported to a disc-like carrier fixed to the crank arm, (4) a chain gear having internal teeth engageable with the planetary gears is rotatably provided, (5) a plurality of lock pawls are provided between the respective sun gears and the fixing member to be independently swingable to lock or unlock the rotation of the sun gears, and (6) a cylindrical control member having bores for receiving therein the tips of the lock pawls is provided, so that the control member is rotated to forcibly actuate each lock pawl in the unlocking direction.

The conventional speed change device provides for manual operation of the control member to actuate the lock pawls in the unlocking direction, so that when the bicycle speed is manually changed in the condition in which the chain gear is driven by a treading force, the speed change operation via the control member is very heavy, thereby creating a problem in that the speed change operation is hard to carry out.

In particular, in a case in which the treading force is transmitted from the crank arm to the chain gear through the carrier and planetary gears to thereby drive the chain gear in the state where rotations of the sun gears are restrained by the lock pawls, since a reaction force caused by rotation of each planetary gear acts on the engaging portion of the lock pawl with the sun gear, even when the control member is operated, it is difficult to actuate the lock pawls in the unlocking direction, with the result that, when the treading force drives the chain gear, it is very hard to carry out the speed control function.

SUMMARY OF THE INVENTION

An object of the invention is to provide a speed change device for a bicycle, which utilizes rotation of a driving shaft rotatable by a cyclist's treading force to forcibly actuate in the unlocking direction lock pawls for locking and unlocking rotations of the sun gears, so that, even when the treading force drives the chain gear, the speed change operation can be easily carried out.

The speed change device of the invention, which is provided around a crank shaft supported to the bicycle frame to rotate relative thereto, is provided with (1) a fixed shaft fixed to the bicycle frame, (2) a plurality of sun gears having different numbers of teeth from each other and is supported to the fixed shaft to be independently rotatable relative to the fixing shaft, (3) a driving member rotatable integrally with the crank shaft, (4) a plurality of planetary gears each having a different number of teeth from each other and engageable with teeth of the sun gears and supported to rotated relative to the driving member, (5) a driven rotary member having internal teeth engageable with those of one of the planetary gears and at the outer periphery at least one sprocket, the driven member being supported to rotate relative to the driving member, (6) a plurality of lock pawls swingably supported to the fixed shaft to lock or unlock rotation of each sun gear relative to the fixed shaft, (7) a control member supported movably relative to the fixed shaft and the crank shaft and having a plurality of clutch pawls, the control member being movably controlled to allow the clutch pawls to move away from or toward the lock pawls respectively to control the lock pawls in locking and unlocking positions, (8) a pawl control unit provided at the outer periphery of the crank shaft so that the crank shaft rotates to actuate, via the pawl control unit, the clutch pawls moved to contact the lock pawls to move the lock pawls in the unlocking direction with respect to the sun gears, and (9) release position holding means for holding the lock pawls at the unlocking position such that the lock pawls are unlocked with respect to the sun gears.

When the crank shaft is driven to rotate by the cyclist's treading force, the control member is operated and the clutch pawls are moved with respect to the crank shaft, and the pawl control unit at the crank shaft actuates the clutch pawls. In turn, the lock pawls are operated in the unlocking direction following operation of the clutch pawls, so that each sun gear is freely rotatable. Hence, the treading force is transmitted from the driving member to the chain gear through the planetary gears, thereby enabling the chain gear to be rotated at reduced speed. In this case, the control member is operable independently of operation of each lock pawl, and each lock pawl can be forcibly actuated in the unlocking direction via rotation of the crank shaft, whereby the control member can readily change the bicycle speed. When the control member is operated in the reverse direction, the lock pawls are released from the clutch pawls and lock the rotation of each sun gear, so that the treading force is transmitted from the driving member to the chain gear through the planetary gears, thereby rotating the chain gear at increased speed.

The above and further objects and novel features of the invention will be more fully apparent from the following detailed description when the same is read in connection with the accompanying drawings.

BRIEF DESCRIPTION OF THE DRAWINGS

FIG. 4 is a partial cutaway front view of a fixed shaft only;

FIG. 5 is a partial cutaway side view of the fixing shaft only; and

FIGS. 6 through 8 are illustrations of the operating condition of the speed change device.

DETAILED DESCRIPTION OF THE PREFERRED EMBODIMENT

Figure 1:
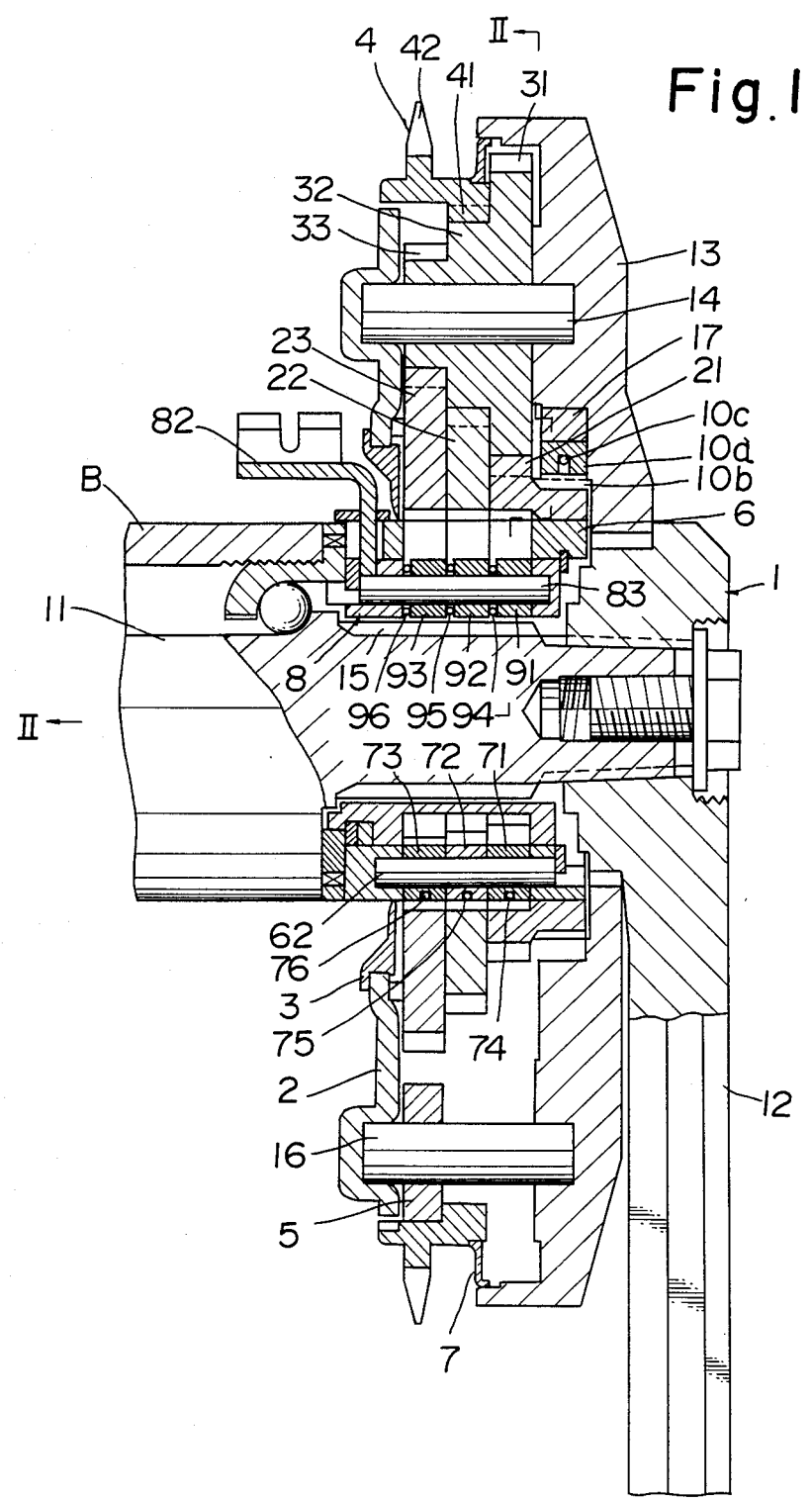
FIG. 1 is a longitudinal sectional front view of an embodiment of a speed change device of the invention.

The speed change device shown in the drawings can perform a four-stage speed change, in which a driving member 1 is provided with a crank shaft 11 rotatably supported to a bottom bracket B at the bicycle frame, a pair of crank arms 12 provided at both axial ends of crank shaft 11, and a disc-like transmitting member 13 mounted on a boss of one crank arm 12. A fixed cylindrical shaft 6 supported non-rotatably to bottom bracket B is sleeved onto the outer periphery of crank shaft 11. Three sun gears 21, 22 and 23 having different numbers of teeth are independently rotatably supported around fixed shaft 6. Planetary gears 31, 32, and 33 having different numbers of teeth are engageable with sun gears 21 through 23. Gears 31–33 are supported to transmitting member 13 through a pivot shaft 14. A driven rotary member 4, which has at its inner periphery internal teeth 41 engageable with the planetary gear 32 and at its outer periphery one sprocket 42, is rotatably supported to transmitting member 13 through rollers 5. Three lock pawls 71, 72 and 73 for locking or unlocking rotation of the respective sun gears 21 to 23 are independently swingably supported to fixed shaft 6. A cylindrical control member 8 is rotatably supported at the inside of fixed shaft 6. Three clutch pawls 91, 92 and 93 are actuated by operation of control member 8 so as to control lock pawls 71 to 73 at the locking position and the unlocking position. Pawls 91–93 are provided at control member 8 to be movable circumferentially of crank shaft 11. At the outer periphery of crank shaft 11 are provided pawl controls 15 which forcibly actuate clutch pawls 91 to 93 by rotation of crank shaft 11 to thereby actuate lock pawls 71 to 73 in the unlocking direction.

Figure 2:
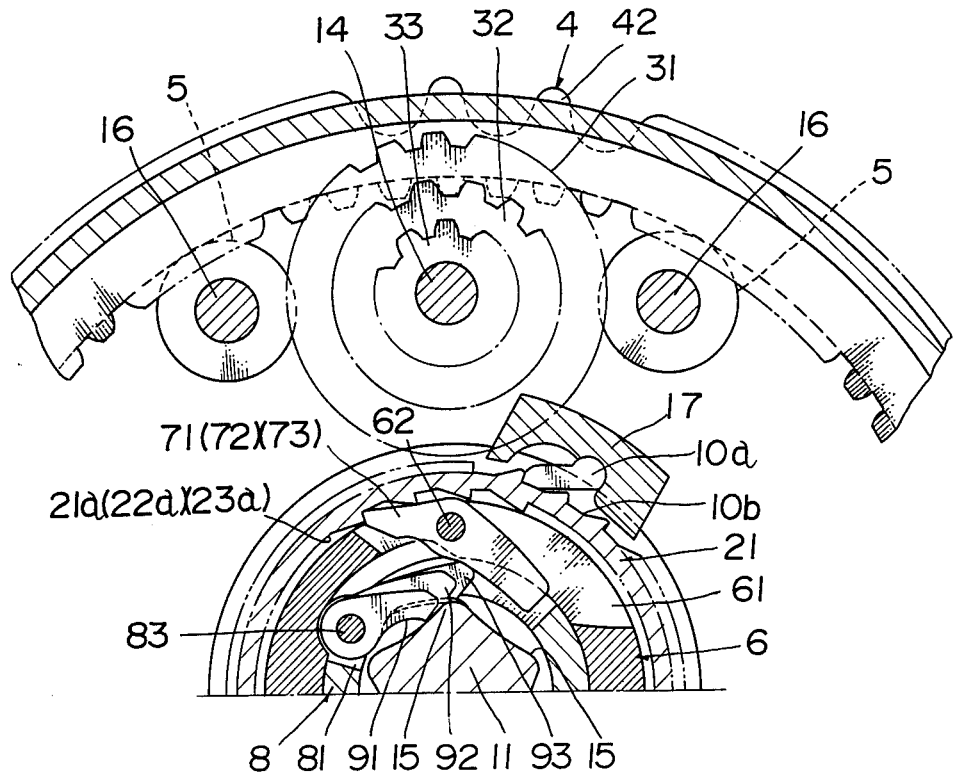
FIG. 2 is a partial longitudinal sectional side view taken on line II—II in FIG. 1.
Figure 3:
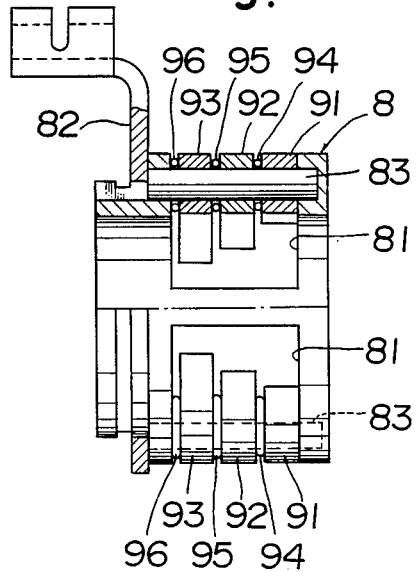
FIG. 3 is a partial cutaway front view showing the condition in which a control member supports clutch pawls.

In the above-described construction, crank shaft 11, as shown in FIG. 2, is formed in, for example a pentagonal sectional shape at the outer periphery of an intermediate portion thereof, thereby forming pawl controls 15. Each corner thereof interferes with respective clutch pawls 91 to 93 to control them. Alternatively, a single pawl control 15 may be used.

Sun gears 21 to 23 are composed of discs each having at its outer periphery a large number of teeth and at its inner periphery ratchets 21a, 22a and 23a. Sun gears 21–23 are supported parallel to each other at the outer periphery of fixed shaft 6.

Between the outer periphery at one axial end of low speed sun gear 21 having a smaller number of teeth and the inner side surface of transmitting member 13 is provided a unidirectional rotary transmission mechanism comprising an anti-reverse-rotation pawl 10a, ratchets 10b engageable therewith, and a pawl spring 10c for biasing anti-reverserotation pawl 10a toward ratchets 10b.

Planetary gears 31 to 32 are integral and pivoted to transmitting member 13 through one pivot shaft 14. The embodiment shown in the drawing is provided with two sets of planetary gears symmetrically disposed.

Driven rotary member 4 has at its outer periphery a sprocket 42 and is formed in a ring shape having internal teeth 41 at the inner periphery of one axial end. Driven member 4 is rotatably supported at the inner periphery of its other axial end to transmitting member 13 by use of a pair of rollers 5 rotatably supported thereto at both circumferential sides of planetary gear 33 through support shafts 16 respectively as shown in FIG. 2.

Lock pawls 71 to 73 each are provided with an engaging portion engageable with respective ratchets 21a to 23a and contact portions to abut against clutch pawls 91 to 93 respectively, and are contained in a through bore 61 provided at fixed shaft 6. Also, one pivot shaft 62 swingably supports lock pawls 71 to 73 at an intermediate portion thereof. Lock pawls 71 to 73 are biased in the engaging direction with ratchets 21a to 23a through pawl springs 74, 75 and 76 provided between respective lock pawls 71 to 73 and fixed shaft 6.

Control member 8 is provided at an axially intermediate portion with a through bore 81 into which clutch pawls 91 to 93 are housed and at one axial end with an arm 82 projecting outwardly from one end of fixed shaft 6, so that an operating wire (not shown) supported to arm 82 is pulled to rotate clutch pawls 91 to 93 toward lock pawls 71 to 73. Between control member 8 and fixed shaft 6 is provided a return spring (not shown) for biasing control member 8 in the restoring direction, i.e., opposite to the direction it is pulled by the operating wire, so that, when the operating wire is released, control member 8 rotates counterclockwise in FIG. 2 by the bias applied by the return spring to be restored to its rest position.

Clutch pawls 91 to 92, as shown in in FIG. 2, have different lengths and are biased toward lock pawls 71 to 73 by second pawl springs 94, 95 and 96 provided between clutch pawls 91 to 93 and control member 8, thereby making contact at their tip portions with lock pawls 71–73 at the contact portions of pawls 71–73.

A spring force of the respective second pawl springs 94 to 96 which bias pawls 91–93 in a direction of engaging with pawls 71–73 is made larger than that of the respective first pawl springs 74 to 76 which bias pawls 71–73 in a direction of engaging with ratchets 21a–23a. When control member 8 is operated to bring clutch pawls 91 to 93 into contact with lock pawls 71 to 73, if no driving force is transmitted to crank shaft 11 to cause pawl controls 15 to forcibly actuate clutch pawls 91–93 and in turn to actuate lock pawls 71–73 in the unlocking direction, lock pawls 71 to 73 can be controlled through second pawl springs 94 to 96 to move from the locking position to the unlocking position with respect to sun gears 21, 22 and 23 due to the above-noted greater spring force of springs 94–96 relative to springs 74–76. Thus, springs 94–96 provide a release position holding means for holding lock pawls 71–73 at an unlocking position relative to the sun gears.

In a condition in which the driving force is transmitted to crank shaft 11 and the reaction force thereof acts on lock pawls 71 to 73 in engagement with sun gears 21, 22 and 23, even when control member 8 is operated to cause clutch pawls 91 to 93 to contact lock pawls 71 to 73, lock pawls 71 and 73 each require a large operating force in order to release the engagement by the reaction of the driving force acting on lock pawls 71 to 73. In this case, clutch pawls 91 to 93 in contact with lock pawls 71 to 73 are forcibly swung in the unlocking direction of lock pawls 71 to 73 by the push-up of pawl control 15 caused by rotation of crank shaft 11. As a result, the engagement of respective lock pawls 71 to 73 is simply released by use of the driving force of crank shaft 11. In addition, in the embodiment in FIG. 2, clutch pawls 91 to 93 are disposed in parallel within through bore 81 and supported swingably by one pivot shaft 83.

In addition, in FIG. 1, reference numeral 2 designates a disc-like cover mounted to transmitting member 13 through pivot shafts 14 and 16, and reference numerals 3 and 7 designate sealing rings. Reference numeral 17 designates a holder to hold anti-reverse-rotation pawl 10a to transmitting member 13.

The speed change device of the invention shown in FIG. 2 is in the state of the highest speed at the front-stage speed change mode. Clutch pawls 91 to 93 retract with respect to lock pawls 71 to 73 so that, even when crank shaft 11 rotates, lock pawls 71 to 73 are not operated in the unlocking direction, lock pawls 71 to 73 engaging with ratchets 21a to 23a so as to lock the rotation of respective sun gears 21 to 23 with respect to fixed shaft 6. Accordingly, the pedaling force is transmitted to planetary gears 31-33 through crank arm 12, transmitting member 13 and pivoted shaft 14, thereby transmitting the high speed rotation of high speed planetary gear 33 to driven rotary member 4 so as to rotate sprocket 42 at high speed.

Turning now to a condition where the speed is changed from the four-stage speed change mode to the three-stage speed change mode, the operating wire is pulled to rotate control member 8 clockwise in FIG. 2 and longest clutch pawl 93 is brought into contact with lock pawl 73. Accordingly, as crank shaft 11 rotates, as shown in FIG. 6, clutch pawl 93 swings only toward lock pawl 73 by pawl control 15, whereby lock pawl 73 corresponding to clutch pawl 93 swings in the unlocking direction. As a result, only high speed sun gear 23 is freely rotatable with respect to fixed shaft 6. The treading force by pedaling is transmitted to the planetary gear through crank arm 12, transmitting member 13 and pivot shaft 14, middle speed planetary gear 32 rotating relative to middle speed sun gear 22 and the rotation of middle speed planetary gear 32 being transmitted, thereby rotating sprocket 42 at high and middle speed.

Next, when the speed is changed from the three-stage speed change mode to the two-stage speed change mode, the operating wire is pulled to further rotate control member 8 clockwise in FIG. 6 to bring middle length clutch pawl 92 in contact with lock pawl 72. Accordingly, as crank shaft 11 rotates, as shown in FIG. 7, clutch pawls 92 and 93 swing toward lock pawls 72 and 73 by pawl control 15, and the lock pawls corresponding to clutch pawls 92 and 93 are swung in the unlocking direction respectively. As a result, the high speed and middle speed sun gears 22 and 23 are freely rotatable with respect to fixed shaft 6. Accordingly, the treading force is transmitted to the planetary gear through crank arm 12, transmitting member 13 and pivot shaft 14, so that low speed planetary gear 31 rotates relative to low speed sun gear 21, and the rotation of low speed planetary gear 31 is transmitted to driven rotary member 4, thereby rotating sprocket 42 at low speed.

Next, when the speed is changed from the two-stage speed change mode to the lowest speed one-stage speed change mode, the operating wire is pulled to rotate control member 8 clockwise in FIG. 7, so that shortest clutch pawl 91 swings with respect to lock pawl 71. Accordingly, as crank shaft 11 rotates, as shown in FIG. 8, clutch pawls 91 to 93 are swung toward lock pawls 71 to 73. As a result, lock pawls 71 to 73 corresponding to clutch pawls 91 to 93 respectively swing in their unlocking directions, with sun gears 21 to 23 being freely rotatable with respect to fixing member 6. Anti-reverse-rotation pawl 10a and ratchet 10b engage with each other so that sun gear 21 may not rotate relative to transmitting member 13 by the tension of a driving chain engaging with the sprocket. In other words, when sun gear 21 is freely rotatably, the tension of the chain is transmitted from sprocket 42 to sun gear 21 through planetary gears 32 and 31, so that sun gear 21 may rotate clockwise in FIG. 8 with respect to transmitting member 13, whereby the undirectional rotary transmission mechanism provided with anti-reverse-rotation pawl 10a and ratchet 10b is provided to restrain rotation of sun gear 21 relative to transmitting member 13. Accordingly, in this case, crank arm 12, transmitting member 13, pivot shaft 14 and planetary gears 31, 32 and 33, and driven rotary member 4 rotate integrally with each other. Thus, driven member 4 rotates with driving member 1 in a 1:1 relationship. Therefore, the driving force of the driving member is transmitted to the driven member without the driven member being accelerated or decelerated with respect to the driving member.

When the speed changes from the high speed mode to the low speed mode as described above, control member 8 is operated to move clutch pawls 91 to 93 independently of the operation of lock pawls 71 to 73, clutch pawls 91 to 93 being swung by pawl control 15 by use of the rotation of crank shaft 11 to thereby forcibly actuate lock pawls 71 to 73 in the unlocking direction. Hence, even when sprocket 42 is driven by the pedaling force, control member 8 can be easily operated.

Also, when the speed is changed from the low speed mode to the high speed mode, the operating wire is loosened to return control member 8 by a predetermined amount by the action of a spring force of the return spring, whereby clutch pawls 91 to 93 retract with respect to lock pawls 71 to 73, and clutch pawls 91 to 93, even when crank shaft 11 rotates, do not swing over the constant amount toward lock pawls 71-73. Accordingly, lock pawls 71 to 73 are released from clutch pawls 91 to 93 and engage with ratchets 21a to 23a, whereby sun gears 21 to 23 are locked against rotation. Accordingly, the treading force is transmitted to driven rotary member 4 through planetary gears 31-33 in engagement with the locked sun gears so that sprocket 42 rotates at the two-, three- or four-stage modes.

Alternatively, in the above embodiment, lock pawls 71 to 73 and clutch pawls 91 to 93 may be separately supported. In this case, clutch pawls 91 to 93 may be equal in length.

Alternatively, clutch pawls 91 to 93, rather than moving circumferentially of the crank shaft, may move axially thereof.

Also, a speed change device of two-, three- or five-stage or more speed change mode can be similarly constructed.

As seen from the above, the speed change device of the invention is constructed such that the plurality of sun gears 21 to 23 are separatedly rotatably supported to crank shaft 11, and planetary gears 31 to 33 engageable therewith are supported to driving member 1. Driven rotary member 4 having internal teeth engageable with at lest one planetary gear is provided, and a plurality of swingable lock pawls 71 to 73 for locking or unlocking the sun gears are provided. A plurality of clutch pawls 91 to 93 operated by control member 8 and for controlling lock pawls 71-73 and a transmission control 15 is provided at the outer periphery of crank shaft 11 as described above. As a result, control member 8 is operable independently of the operation of lock pawls 71 to 73 and lock pawls 71 to 73 can be forcibly moved in the unlocking direction by use of the rotation of the crank shaft. Hence, even when driven rotary member 4 is driven by pedaling, the speed change by the control member can be carried out with ease.

While an embodiment of the invention has been shown and described above, the invention is not limited to the specific construction of this embodiment, which is merely exemplary rather than defined or limited.

What is claimed is:

1. A speed change device for a bicycle, said speed change device comprising:
   (a) a crank shaft adapted to be supported to rotate relative to a frame of the bicycle;
   (b) a fixed shaft adapted to be fixed to said frame of the bicycle
   (c) a plurality of sun gears having a different number of teeth from each other and supported to said fixed shaft to be independently rotatable relative to said fixed shaft,
   (d) a driving member supported to be rotatable integrally with said crank shaft,
   (e) a plurality of gears each having a different number of teeth from each other and engageable with teeth of said sun gears and supported to rotate relative to said driving member,
   (f) a driven rotary member including an inner periphery having internal teeth engageable with teeth of one of said planetary gears and an outer periphery including at least one sprocket, said driven rotary member being supported to rotate relative to said driving member,
   (g) a plurality of lock pawls swingably supported to said fixed shaft to lock or unlock rotation of said sun gears relative to said fixed shaft,
   (h) a control member supported movably relative to said fixed shaft and having a plurality of clutch pawls, said control member being movably operated to move said clutch pawls away from or toward said lock pawls to control positioning of said lock pawls in locking and unlocking positions relative to said sun gears,
   (i) a pawl control provided at the outer periphery of said crank shaft such that said pawl control, when said crank shaft rotates, actuates said clutch pawls to contact said lock pawls to move said lock pawls in an unlocking direction with respect to said sun gears, and
   (j) release position holding means for holding said lock pawls at an unlocking position such that said lock pawls are unlocked with respect to said sun gears.

2. A speed change device according to claim 1, wherein said control member is supported to be circumferencially movable with respect to said crank shaft, said clutch pawls including respective engaging portions engageable with said lock pawls, said engaging portions at each of said clutch pawls engaging stepwise respectively with each of said lock pawls responsive to circumferential movement of said control member relative to said crankshaft.

3. A speed change device according to claim 2, wherein said engaging portions of said clutch pawls are displaced relative to each other in a direction oriented circumferentially of said crank shaft.

4. A speed change device according to claim 3, further comprising a first pivot shaft on which each of said lock pawls is swingably supported, a second pivot shaft on which each of said clutch pawls is swingably supported, said clutch pawls being different in length from each other, and said engaging portions of said clutch pawls are displaced relative to each other in a direction oriented circumferentially of said crank shaft.

5. A speed change device according to claim 1, wherein said lock pawls are provided with first pawl springs biasing said lock pawls in a direction of engaging with said sun gears respectively, said clutch pawls being provided with second pawl springs biasing said clutch springs in a direction of engaging with said lock pawls respectively, each of said second pawl springs being provided with a spring force greater than that of each of said first pawl springs, so that the spring force of said second pawl springs is adapted to hold at an unlocking position each of said lock pawls unlocked with respect to said sun gears.

6. A speed change device according to claim 1, further comprising a unidirectional rotary transmission mechanism provided between (i) a sun gear having a smallest number of teeth among said plurality of sun gears and (ii) said driving member.

* * * * *